S. SCHOLFIELD & C. E. BAKER.
Paper-Feeding Machine.

No. 164,488.  Patented June 15, 1875.

WITNESSES:
A. W. Almqvist
C. Kilquick

INVENTOR:
S. Scholfield
C. E. Baker
BY
ATTORNEYS.

UNITED STATES PATENT OFFICE.

SOCRATES SCHOLFIELD, OF PROVIDENCE, RHODE ISLAND, AND CHARLES E. BAKER, OF MONT CLAIR, NEW JERSEY.

IMPROVEMENT IN PAPER-FEEDING MACHINES.

Specification forming part of Letters Patent No. 164,488, dated June 15, 1875; application filed March 13, 1875.

*To all whom it may concern:*

Figure 1:
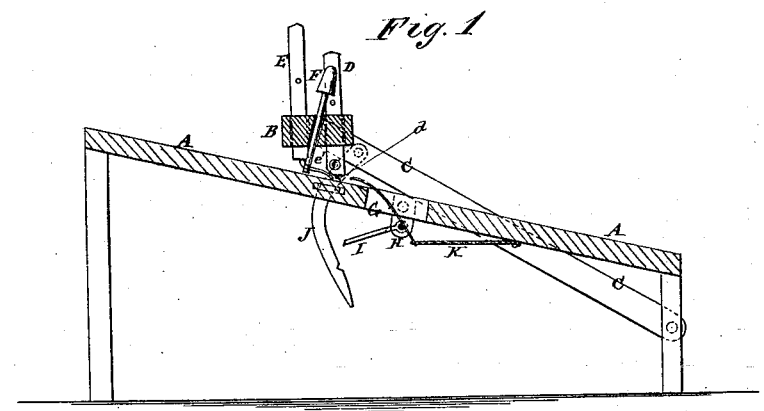
Figure 2:
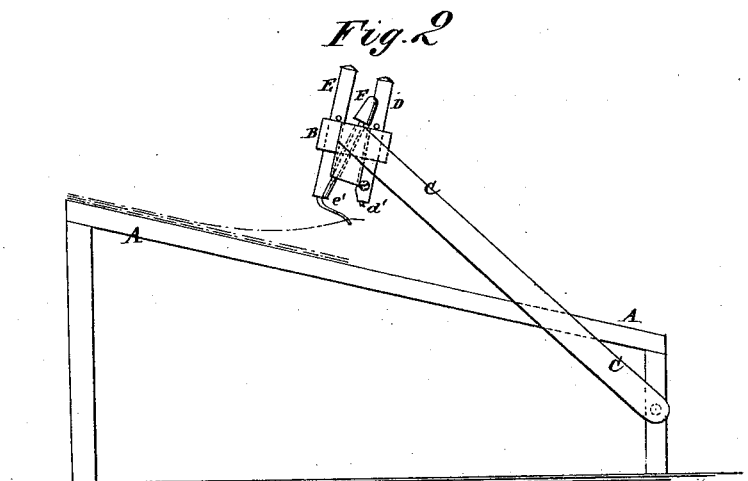
Figure 3:
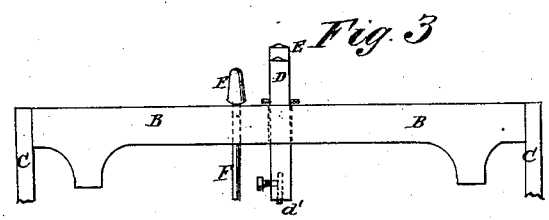

Be it known that we, SOCRATES SCHOLFIELD, of Providence, in the county of Providence and State of Rhode Island, and CHAS. E. BAKER, of Mont Clair, in the county of Essex and State of New Jersey, have invented a new and useful Improvement in Paper-Feeding Machines, of which the following is a specification:

Figure 1 is a vertical section of a feed-table to which our improved device has been applied. Fig. 2 is a side view of the same. Fig. 3 is a front view of the same.

Similar letters of reference indicate corresponding parts.

Our invention has for its object to furnish an improved device for raising the edge of the top sheet of a pile of paper from the sheet below, in order that the sheets may be successfully fed to a printing-press or other machine a single sheet at a time.

The invention consists in the combination of a lifting-pin and a separate cutter with each other in such a way that the cutter may make a hole in the top sheet and rise to allow the pin to raise the edge of the sheet, and in the combination of a holder with the cutter and the lifting-pin, as hereinafter fully described.

A represents an ordinary feed-table. B represents a bar or support placed above the table A to receive the device. In the drawings the support B is represented as being attached to the ends of two arms, C C, the outer ends of which are pivoted to the frame of the table A, so that the support B may move through the arc of a circle. D E are two bars placed in holes in the support B, and provided with stops to prevent them from dropping out of said holes. The bar D is placed directly in front of the bar E, and to its lower end is attached a cutter, $d'$, which rests upon the upper sheet of the pile, and when drawn either forward or backward, as preferred, tears a small hole in the said upper sheet. The bar D may be weighted or made heavy to insure the cutter $d'$ making a hole in the upper sheet, and we prefer to make the cutter adjustable, so that it may be readily projected from the face of the holding-bar D just far enough to cause it to pass through a single sheet. To the lower end of the rear bar E is attached an inclined pin, $e'$, the point of which is placed directly in the rear of and close to the cutter $d'$. The stops of the bars D E are so arranged that the cutter $d'$ will be raised as soon as it has made its cut, so that the point of the inclined pin $e'$ may enter the hole made by the cutter $d'$, and thus raise the edge of the sheet. The bars D E receive their forward movement and the bar D its upward movement from the support B when said support is moved through the arc of a circle. The support B may, however, be made to move in slides or ways, and in this case the cutter $d'$ may be raised by a cam. F is a holding-pin, the edge of which rests upon the pile of paper, and which is so arranged as regards its inclination to the table A and to its support B as to remain stationary while the cutter and lifter are moving forward, but will be raised at the same time as, or immediately after, the cutter $d'$. G is a stop or clamp for holding the pile of paper, and which is so constructed as to be withdrawn at the time the upper sheet is raised, and to again clamp the paper beneath said sheet. The stop G is attached to a shaft, H, that rocks in bearings attached to the table A, and to one end of which is attached an arm, I, which projects so that its outer end may be caught by a notch in a latch, J, pivoted to the support B. After the stop G has been thrown back to withdraw a sheet it is drawn down to again clamp the paper by means of a spring, R, attached to its lower end. The cutter $d'$ and the lifter $e'$ may be arranged to operate near either edge of the sheet of paper, as may be most desirable.

Heretofore, in all attempts to pick up and raise the edge of the sheet of paper by means of penetrating instruments or inclined pins, the instrument has been made to perform the double office of making the hole and of raising the edge of the sheet for proper presentation to carrying-gripers, or for other purposes.

In our present application the proper penetration of the top sheet is effected by means of an instrument especially designed for this purpose, thus effectually securing the desired uniformity and precision. The inclined pin is, therefore, relieved from the office of penetration, which requires for its proper performance conditions opposed to those required for simply lifting the edge of the sheet. We therefore claim that the separate embodiment of these two conflicting functions, heretofore exclusively embraced in a single instrument, constitutes the gist of our invention.

In operating with a cutter arranged to make a hole through the top sheet of a pile of paper it is necessary, in order to secure certainty of action, to apply a considerable amount of pressure; and to enter the hole so formed to the best advantage, the lifting-pin should move forward comparatively light. The conditions essential to the production of the best attainable results are therefore supplied by our present invention, as the pressure upon the cutter and pin may be separately gaged and regulated, as desired.

Having thus described our invention, we claim as new and desire to secure by Letters Patent—

1. The combination of a lifting-pin, $e'$, and a cutter, $d'$, with each other in such a way that the cutter may first make a hole and rise to allow the lifting-pin to enter and raise the edge of the sheet, substantially as described.

2. The combination of a holder, F, with the cutter $d'$ and the inclined lifting-pin $e'$, substantially as described.

SOCRATES SCHOLFIELD.
   CHARLES E. BAKER.

Witnesses:
 JAMES T. GRAHAM,
 T. B. MOSHER.